(12) United States Patent
Stuckert et al.

(10) Patent No.: US 10,792,610 B2
(45) Date of Patent: Oct. 6, 2020

(54) PROCESS FOR GENERATING HIGHER VPSA PRODUCT PRESSURE

(71) Applicants:Nicholas R. Stuckert, Grand Island, NY (US); Yang Luo, Amherst, NY (US); Osemwengie Uyi Iyoha, Fayetteville, GA (US); Jeffrey Abbatiello, Corfu, IN (US); Timothy M. Aaron, E. Amherst, NY (US)

(72) Inventors: Nicholas R. Stuckert, Grand Island, NY (US); Yang Luo, Amherst, NY (US); Osemwengie Uyi Iyoha, Fayetteville, GA (US); Jeffrey Abbatiello, Corfu, IN (US); Timothy M. Aaron, E. Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 244 days.

(21) Appl. No.: 15/945,962

(22) Filed: Apr. 5, 2018

(65) Prior Publication Data

US 2018/0290098 A1 Oct. 11, 2018

Related U.S. Application Data

(60) Provisional application No. 62/482,941, filed on Apr. 7, 2017.

(51) Int. Cl.
*B01D 53/047* (2006.01)
*B01D 53/04* (2006.01)
(Continued)

(52) U.S. Cl.
CPC ........ *B01D 53/0476* (2013.01); *B01D 53/02* (2013.01); *B01D 53/0423* (2013.01); *B01D 53/0431* (2013.01); *B01D 53/0473* (2013.01); *B01D 53/053* (2013.01); *B01J 20/18* (2013.01); *B01D 2253/108* (2013.01);
(Continued)

(58) Field of Classification Search
CPC ...... B01D 53/02; B01D 53/04; B01D 53/047; B01D 53/0423; B01D 53/0431; B01D 53/0473; B01D 53/0476; B01D 53/053; B01D 2253/108; B01D 2253/1085; B01D 2256/12; B01D 2257/102;
(Continued)

(56) References Cited

U.S. PATENT DOCUMENTS 4,477,583 A 10/1984 Rodewald
5,122,164 A 6/1992 Hirooka et al.
(Continued)

FOREIGN PATENT DOCUMENTS

WO WO 2010/109477 A2 9/2010

*Primary Examiner* — Frank M Lawrence, Jr.
(74) *Attorney, Agent, or Firm* — Ralph J. Mancini

(57) ABSTRACT

The invention relates to a process for modifying the VPSA/VSA/PSA cycle to allow for maximum product pressure without the need for a base load oxygen compressor (BLOC) or base load oxygen blower (BLOB), thus supplying low pressure oxygen (3 to 7 Psig) to the end user while at the same time lowering product costs 10 to 30%. The system of this invention preferably employs larger piping runs from the VPSA to the oxy-fuel control skids, larger piping for the oxy-fuel control skid, larger piping for the VPSA, low pressure drop flow measurements, and low pressure drop check valves.

18 Claims, 7 Drawing Sheets

(51) Int. Cl.
*B01D 53/053* (2006.01)
*B01J 20/18* (2006.01)
*B01D 53/02* (2006.01)

(52) U.S. Cl.
CPC .. *B01D 2253/1085* (2013.01); *B01D 2256/12* (2013.01); *B01D 2257/102* (2013.01); *B01D 2259/402* (2013.01); *B01D 2259/4006* (2013.01); *B01D 2259/40013* (2013.01); *B01D 2259/40028* (2013.01)

(58) Field of Classification Search
CPC ........... B01D 2259/40013; B01D 2259/40028; B01D 2259/2006; B01D 2259/402; B01J 20/18
USPC ................................ 95/96, 130, 148; 96/121
See application file for complete search history.

(56) References Cited

U.S. PATENT DOCUMENTS

| | | |
|---|---|---|
| 5,429,666 A | 7/1995 | Agrawal et al. |
| 5,702,504 A | 12/1997 | Schaub et al. |
| 6,010,555 A | 1/2000 | Smolarek et al. |
| 6,152,991 A | 11/2000 | Ackley |
| 6,428,607 B1 | 8/2002 | Xu et al. |
| 6,500,234 B1 | 12/2002 | Ackley et al. |
| 6,506,234 B1 | 1/2003 | Ackley et al. |
| 6,878,657 B2 | 4/2005 | Jasra et al. |
| 2008/0134889 A1* | 6/2008 | Zhong ................ B01D 53/0473 95/148 |
| 2010/0300285 A1 | 12/2010 | Siew-Wah et al. |
| 2013/0340614 A1* | 12/2013 | Barrett .................. B01D 53/02 95/96 |
| 2013/0340615 A1 | 12/2013 | Barrett et al. |
| 2015/0343417 A1 | 12/2015 | Puranik et al. |

* cited by examiner

PROCESS FOR GENERATING HIGHER VPSA PRODUCT PRESSURE

RELATED APPLICATIONS

This application claims the benefit of U.S. Provisional Application Ser. No. 62/482,941, filed on Apr. 7, 2017, which is incorporated herein by reference.

FIELD OF THE INVENTION

The present invention relates to a process for modifying a VPSA/VSA/PSA cycle to allow for maximum product pressure without the need for a base load oxygen compressor (BLOC) or base load oxygen blower (BLOB). Typical plants produce oxygen in the range of 1-2 psig while consumption for combustion and other applications is required at 2-8 psig. According to the present invention, a higher rate adsorbent can be used with a modified process cycle to more effectively and efficiently deliver the oxygen for the end consumer with substantial capital and operating expense savings. These benefits are applicable to any system delivering 1 psig up to 11 psig without product compression.

BACKGROUND OF THE INVENTION

Typically VPSA $O_2$ production occurs at a low pressure such that compression of the product $O_2$ stream is required in order to service the customer. A goal of this invention is to employ advanced materials to enable a higher delivery pressure of oxygen such that product compression can be eliminated.

U.S. Pat. No. 6,500,234 to Ackley et al. describes processes utilizing advanced adsorbents with high intrinsic diffusivities relative to conventional adsorbents. Increased oxygen recovery was demonstrated by increasing the rates of adsorption/desorption to create higher nitrogen mass transfer coefficients at a fixed pressure ratio. These rates were defined as a mass transfer coefficient of $>=12/s$ and an intrinsic $N_2$ diffusivity of $3.5 \times 10^{-6}$ $m^2/s$ at 1.5 bar and 300k. This concept was then applied to achieve very short cycles (e.g., greater than 10 s) and very low bed size factors (BSF) while affecting only a minimal decrease in product recovery. The present invention utilizes advanced properties along with cycle modifications to deliver higher supply pressure without the use of product compression.

U.S. Pat. No. 6,506,234 to Ackley et al., which is incorporated herein in its entirety, describes an advanced process that utilizes high intrinsic diffusivity adsorbents. Ackely et al. specifically teach the need to pressurize the adsorption bed with product gas in addition to feed gas in order to achieve the required purity. Ackley also teach a method for preparing the high intrinsic diffusivity adsorbents which are utilized in the process of the present invention.

In the article "Study of a novel rapid vacuum pressure swing adsorption process with intermediate gas pressurization for producing oxygen" by Zhu et. al. the teachings again demonstrate the requirement of product pressurization in order to achieve high purity and high productivity. The authors also teach specifically the correlation between increased product pressurization and increased productivity from the material and system.

U.S. Pat. No. 5,122,164 to Hirooka et al. describes 6, 8 and 10-step vacuum pressure swing adsorption (VPSA) processes for separating air to produce oxygen. The main emphasis of this patent is the cycle configuration and detailed operation of the various cycle steps to improve yield and productivity, targeted for >90% purity cycles. Additional steps such as product pressurization and split equalization helped increase production for high purity applications >90%.

U.S. Pat. No. 5,702,504 to Schaub et al. the authors proposed a cycle to significantly decrease power consumption for in use industrially for O2 VPSA plants. The advance of the overlapping equalization and evacuation significantly diminished the limitations of industrial vacuum blowers and also increased the working capacity of the adsorbents by providing a lower overall bottom pressure to the bed. The authors also required the use of product pressurization.

In U.S. Pat. No. 6,010,555 to Smolarek et al. the authors proposed modifications to the cycle detailed by Schaub et al. to include an additional step that would isolate the adsorption bed from the surge tank between product pressurization and product make. This step was shown to boost the performance of the production of the VPSA system for 88% to 95% O2 product purities. The authors also required the use of product pressurization.

Since most combustion applications only require ~1 psig supply pressure at the oxygen burner inlet, overcoming the pressure drop throughout the rest of the system can be achieved with a combination of simple engineering modifications (larger piping), higher rate adsorbents and cycle modifications. Additional modifications to the control logic can further increase the supply pressure and enable cost reductions to be taken elsewhere (smaller surge tank or smaller piping). These modifications to the state of the art which are often counter-intuitive or simply the opposite of what has been previously taught, are the basis for this invention.

SUMMARY OF THE INVENTION

The present invention relates to a process for modifying the VPSA/VSA/PSA cycle to allow for maximum product pressure without the need for a base load oxygen compressor (BLOC) or base load oxygen blower (BLOB), thus supplying low pressure oxygen (3 to 7 Psig) to the end user while at the same time lowering product costs 10 to 30%. The system of this invention preferably employs larger piping runs from the VPSA to the oxy-fuel control skids, larger piping for the oxy-fuel control skid, larger piping for the VPSA, low pressure drop flow measurements, and low pressure drop check valves.

DETAILED DESCRIPTION OF THE FIGURES

DETAILED DESCRIPTION OF THE INVENTION

Figure 1:
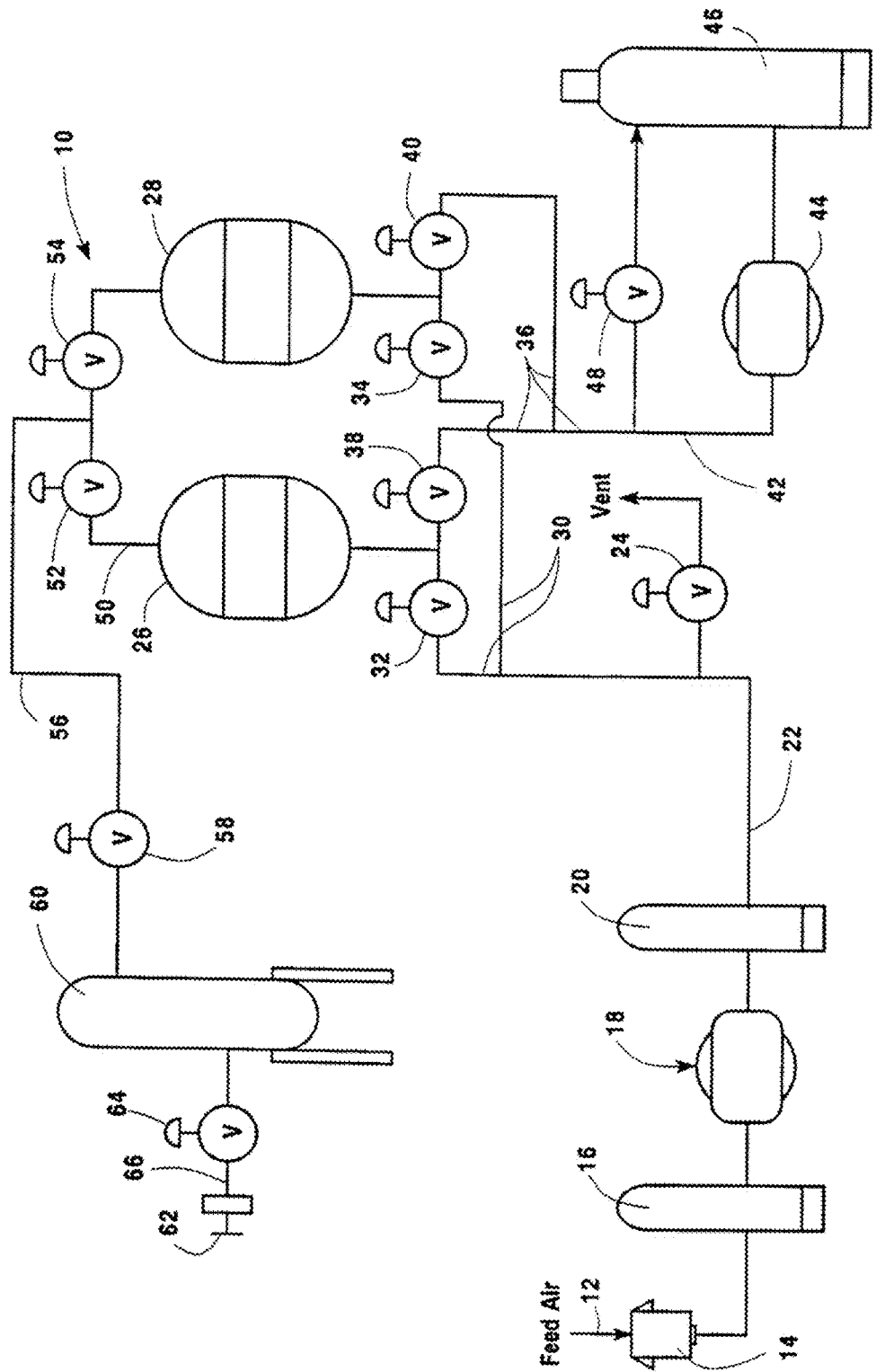
FIG. 1 is a schematic of the VPSA system of the invention.

When supplying oxygen for combustion applications it is typically supplied at pressures that are significantly higher than required. For example, in many applications roughly oxygen at approximately 1 psig is required for injection to provide sufficient mixing, yet oxygen is typically supplied at 12-30 psig. VPSA's designed for glass furnaces, as an example, traditionally include a BLOC or BLOB to raise the delivery pressure of the product oxygen to about 10 to 15 psig. This increases the deployed CAPEX for the VPSA because of the significant costs of the BLOC, depending on the size of the plant. By combining the $O_2$ VPSA and the burner system design, the invention eliminates oxygen compression and delivers low power, low cost, and more reliable oxygen to customers. The process of the invention relies on advanced adsorption materials which enables the elimination of product pressurization as well as a significant reduction in bed pressure drop.

In one embodiment the invention relates to a pressure swing adsorption system method for the separation of components of a feed gas mixture into at least a first component and a second component by selective adsorption of said first component into a bed of adsorbent. The method of the invention comprises the following steps on a cyclic basis:

a) raising the pressure of said feed gas to said bed during adsorption steps of the cycle to an adsorption pressure so as to enable adsorption of said first component by said adsorbent, said adsorbent exhibiting a mass transfer coefficient of $>=12/s$ and an intrinsic $N_2$ diffusivity of $3.5 \times 10^{-6}$ m$^2$/s at 1.5 bar and 300k, depressurizing said bed during the desorption steps of said cycle to a desorption pressure so as to desorb said first component from said adsorbent, a ratio of pressures of said adsorption pressure to said desorption pressure in a range of less than about 5.0, in another embodiment from about 3.5 to about 5, and in yet another embodiment from about 1.5 to about 3.5; wherein said bed is pressurized to said adsorption pressure by pressurized feed gas and with no product pressurization.

Generally, the lowest pressure during a cycle is from about 6 to 12 psia and a highest pressure during said cycle is from about 2 to 12 psig. In one embodiment the bed of adsorbent has a dimension, in a direction of flow of said gas through said bed of adsorbent, of less than about 1.2 m, in another embodiment less than about 0.9 m and in another embodiment less than about 0.6 m and said method performs steps a) and b) in a time of less than about 40 seconds, in another embodiment less than about 30 seconds and in yet another embodiment less than about 20 seconds.

In one preferred embodiment the feed gas is air, said first component is nitrogen and said second component is oxygen.

The "elimination of product pressurization", "without product pressurization", and/or "no product pressurization" is defined as a substantial reduction in the flow of gas from the surge tank 60 to the adsorber bed 26. This can be characterized by the timing of the product make valve 52 opening relating to the difference in pressures between the adsorber bed 26 and the surge tank 60. The inflection point is when the difference between the surge tank and the bed is 0. If the valve 52 opens less than 2 seconds before the inflection point, the amount of gas flowing from the surge tank 60 to the adsorption bed 52 is insignificant to the process and provides no benefit to low rate materials and no penalty to high rate materials. Therefore no product pressurization is defined as a cycle in which the product valve 52 opens less than 2 seconds before the inflection point.

The process of the invention lowers product cost by utilizing high rate adsorbents to eliminate product pressurization and create a larger particle size that reduces bed pressure drop while maintaining performance. In addition to the reduction in pressure drop from increased piping diameters and reduced pressure drop flow measurement techniques, the claimed process is able to eliminate the product compressor, saving significant capital and power. The process here fully utilizes the advanced properties of the high rate and high heat capacity core shell material to deliver substantially higher product pressure. And surprisingly, it has been found that adsorbent productivity can be maintained or even increased without product pressurization.

The above benefits are due to the integrated effects of the high rate adsorbent used at low pressure ratio with short cycles, shallow beds, elimination of the product pressurization step and simplified compression equipment. This more than offsets the lower product recovery that accompanies lower pressure ratios. As mentioned above, the prior art utilizes a product pressurization step wherein at least a portion of the product is circulated back and utilized to pressurize the adsorbent bed. If this product pressurization step is eliminated in processes that utilize traditional adsorbents, a significant performance hit is observed along with increased power consumption per unit of product produced. In the process of the invention the use of advanced rate materials enables elimination of the product pressurization and counter intuitively, the production actually increases and the power per unit of product decreases.

The invention combines low pressure ratio PSA cycles with high adsorbent intrinsic diffusivity and modification of the product pressurization step in order to reduce costs and maintain and even improve productivity. The benefits of the invention may be realized in subatmospheric, transatmospheric and superatmospheric pressure ratio cycles and potentially for any bulk gas separation. The teachings are not limited to advanced absorbents, although the benefits are likely to be most attractive for such high equilibrium performance materials. The benefits of combining low pressure ratio with high adsorbent intrinsic diffusivity, short cycles and shallow beds in PSA air separation are as follows: reduced power consumption, increased adsorbent productivity (reduced BSF), reduced vessel size equivalent or reduced system pressure drop, reduced system costs associated with the elimination of product pressurization, and reduced product cost.

High rate adsorbents as utilized herein have high intrinsic diffusivities relative to conventional adsorbents and are disclosed by U.S. Pat. No. 6,500,234 to Ackley et al., which is incorporated herein by reference. Ackley et al. demonstrated increased oxygen recovery by increasing the rates of adsorption/desorption to create higher nitrogen mass transfer coefficients at a fixed pressure ratio. These rates were defined as a mass transfer coefficient of $>=12/s$ and an intrinsic $N_2$ diffusivity of $3.5 \times 10^{-6}$ m$^2$/s at 1.5 bar and 300k. In another embodiment the high rate adsorbents utilized in the method of the invention have an intrinsic N2 diffusivity equal to or greater than $4.0 \times 10^{-6}$ m$^2$/sec at 1.5 bar and 300k. The present inventors unexpectedly found that when using high rate adsorbents having a mass transfer coefficient of $>=12/s$ and an intrinsic $N_2$ diffusivity of $3.5 \times 10^{-6}$ m$^2$/s at 1.5 bar and 300k, one could eliminate product pressurization, while at the same time have a positive effect on system production. Compared with previous low rate materials that exhibited substantial product purity and production loss, the advanced materials employed herein along with cycle modifications, are able to maintain product purity, deliver higher supply pressure without the use of product compression and increase production all while consuming less power. The counter-intuitive nature of this discovery is illustrated by the in depth teachings of prior art, which consistently teach that more product pressurization (i.e. starting at a lower pressure in the bed during a cycle) leads to higher purity of the product and higher productivity.

The unexpected improvements observed by the present invention manifest rely on the use of high rate materials and have been demonstrated in both models and field tests. Similar improvements were not observed with the low rate materials of the prior art. Among other benefits, the invention enables smaller and more predictable surge tank pressure variation.

The adsorbent is generally a particulate having an average particle diameter of from about 0.8 mm to about 1.6 mm. In one preferred embodiment the adsorbent is a type X zeolite with a $SiO_2/Al_2O_3$ ratio less than or equal to 2.5 and exchanged with Li (>70%).

Adsorbents may be deployed by this invention in one or more distinct adsorption zones, e.g. pretreatment and main adsorbent zones. One or more adsorbents may be contained in each zone, and the zones do not have to be contained in the same adsorbent vessel. The pretreatment zone is located nearest the feed inlet and its purpose is to remove any undesirable contaminants from the feed stream. Typical contaminants in air separation are water and carbon dioxide. Those skilled in the art will appreciate the use of zeolites, activated alumina, silica gel as well as other appropriate adsorbents in the pretreatment zone. The main adsorbent zone is positioned downstream of the pretreatment zone (relative to the flow through the bed during the adsorption step) and contains adsorbent(s) selective for the primary heavy component(s) in the feed. The pretreatment zone may be excluded if there are no contaminants in the feed stream.

The VPSA/PSA processes described herein are those in which the separation of at least two components of a gas phase mixture is affected by differences in equilibrium adsorption capacities of the components in the main adsorbent, i.e. at least one component in the mixture is more selectively adsorbed at equilibrium in comparison to the adsorption of the other components. The invention uses adsorbents that have higher intrinsic diffusion rates than conventional adsorbents.

Without wishing to be bound to any particular theory, it is believed that the mass transfer front plays a significant role in the unexpected improvements of the invention. The part of a bed located between the inlet of the main adsorption zone and the rear of the mass transfer zone is known as the "equilibrium zone". If the bed is made shorter than the length of the mass transfer zone, then the component to be removed will break through the bed immediately at the beginning of the adsorption step. The overall working capacity of the adsorbent for the heavy component is greatest when the fractional size of the mass transfer zone is kept small relative to the total size of the bed, i.e. most of the bed is saturated (equilibrium zone) at the end of the adsorption step. Faster cycles require shorter beds resulting in an increase in the fractional size of the mass transfer zone. The use of adsorbents of high intrinsic diffusivity counters this effect and enables the use of fast cycles while avoiding an increase in the fractional size of the mass transfer zone.

In equilibrium separations, a gas mixture is passed through a bed of adsorbent particles and the more strongly-adsorbed gas component (heavy) is retained, while the other components (light) emerge from the exit of the adsorber. At the beginning of the adsorption step, a mass transfer zone forms and moves through the bed. Nearly all of the adsorption occurs within this zone. The concentration of the gas to be removed decreases from its concentration in the feed mixture to a very low value over the length of this zone. In some separation processes, this zone quickly reaches a constant length (usually significantly smaller than the overall depth of adsorbent bed) and moves through the bed at a constant speed. If relatively high purity light product is desired, the adsorption step must be stopped (and subsequently followed by a regeneration step) when the front of the zone just begins to erupt at the bed exit. At this instant, the bed contains the mass transfer zone near the exit and the remainder of the bed is fully saturated with the more strongly held component in equilibrium with the feed concentration of this component.

The size of the mass transfer zone is influenced by the particle size and the rate of diffusion of gas into the particle. In many cases, the greatest resistance to this diffusion is in the macropores of the particles, i.e. the gas molecules must travel through the narrow and crooked void passages inside the particle to reach the active surfaces of the adsorbent. If the particle size is reduced, this transfer occurs much more rapidly (since the path length is shortened)—resulting in a shorter mass transfer zone. There are both limitations and disadvantages to this approach as small particles lead to increased pressure drop per unit bed length, difficulty in particle retention in the bed and an increased tendency to fluidize. This approach is further limited in that it ignores the possibility of achieving process performance improvements by increasing intraparticle diffusivity directly without any reduction in particle size.

The pressure drop across the adsorbent mass in a fixed bed adsorber is dependent upon the gas velocity through the bed, the size of particles in the bed, the density of packing of the particles and the bed depth. The relationship amongst these variables is established by the well-known Ergun Equation (Chem. Engng. Progress, 1952), which is widely used to determine the pressure loss across a fixed adsorbent bed. Simply, the pressure drop increases for smaller particles, deeper beds, higher gas flows and a denser packing.

While the particular adsorber depends upon the characteristics of the separation to be performed, adsorbent bed pressure-drop less than or equal to 0.25 psi/ft (56 mbar/m) and bed depths of 4.0 ft (1.2 m) to 6.0 ft (1.8 m) have been quite common in $O_2$ production, using $N_2$-selective adsorbents, as well as in other conventional PSA processes. To compensate for the higher pressure drops resulting from reduced particle size, and to minimize the increase in power and tendency to fluidize, it is necessary to decrease the bed depth and/or the flow velocity through the bed. These changes lead to a reduced recovery and trade-off in bed utilization for a fixed particle size, i.e. shorter beds necessitate faster cycles leading to reduced recovery and possibly some improvement in bed utilization, although reduced velocity counters this increase in bed utilization (for a fixed inlet area) due to the resulting lower feed throughput. This also increases the void area of the product which offsets the benefit gain of slower gas velocity with more gas required to fill the voids. Simulations were not able to demonstrate the capability of reaching >=90% purity without a production loss of >10% (at equivalent total plant power) with larger beds for typical adsorbents, which is economically unattractive.

As previously mentioned, the mass transfer front is believed to play a significant role in the unexpected improvements of the invention. This theory was used to predict methodologies for decreasing the production loss for other high rate adsorbents. The previous methodology discovered is the alignment of the top pressure of the bed with the product tank. However if interaction with the surge tank is ramped instead of allowed to be fully open (i.e. the top pressure of the bed is allowed to rise on feed above the pressure in the surge tank), the purity limited production increases further at a negligible increase in power consumption. If done properly, this will prevent an increase in the swing of the surge tank as well as further increase the efficiency of the system.

The elimination of the product compression saves significant investment costs in the VPSA supply system. To be able to deliver the oxygen to the use point at high enough pressure without the need for additional $O_2$ product compression, the reduction of any frictional pressure losses in the $O_2$ distribution piping system used to connect the oxygen plant to the use point is of significant importance. As a result, a lower pressure drop design and arrangement is preferred. This can be achieved by increasing the pipe diameters, and selecting material of construction, fittings, valves, and components which minimize pressure losses, thus resulting in a higher delivery pressure to the oxy-fuel combustion equipment downstream of the $O_2$ plant. A simple economic analysis shows that in some cases this may increase the costs of the system downstream of the VPSA, but the cost increase is appreciably less than the cost savings achieved through the elimination of the $O_2$ compression equipment, the oxygen compressor in addition to the significant reduction of the operating costs of the $O_2$ plant that results from the reduction in power consumption.

The necessity of low frictional pressure drop in the distribution piping must be extended to the measurement and flow control equipment. Measurements based on creating permanent pressure drop such as orifice meters are not supporting this goal result in pressure drop which can be significant in the context of the $O_2$ plant and, as a result, is not preferred for the proposed teaching. The use of low pressure drop flow measurement such as thermal dispersion mass flow meters and vortex shedding flow meters enables the application of the disclosed technology.

The more predictable flow from the surge tank can then be modeled by a simple algorithm to provide a bias to a Proportional Integral Derivative (PID), or any combination therein, controller that naturally contains feedback control from the usage variations downstream, but also is perfectly aligned with the variations in the surge tank from the operation of the VPSA plant. This feed forward biasing has also been demonstrated to accommodate valve lag response and pressure transducer lag with the inherent predictability of this cycle. These modifications all combine into an invention that allows for a significantly reduced pressure drop through the system such that product pressurization is no longer required to deliver the pressure needed at the utilization location downstream.

While this invention has been demonstrated for the case of air separation, the general methodology applies to other gas phase separations that: (1) depend upon differences in equilibrium adsorption selectivity; and (2) in which the mass transfer resistances are dominated by diffusion in the macropores of the adsorbent particles. The methodology is especially applicable to the production of oxygen in PSA processes incorporating $N_2$-selective adsorbents, e.g. type X zeolites or advanced adsorbents such as highly Li-exchanged type X or other monovalent cation-exchanged zeolites. The invention is particularly well suited to the use of adsorbents having high capacity and high selectivity (in combination with high intrinsic diffusivity) for the most selectively adsorbed (heavy) component of the gas mixture to be separated. The method and system of the invention can comprise two or more beds in series or parallel.

In embodiments where the first component comprises N2 and the method of the invention is adapted to recover O2 from feed air, O2 recovery in in a purity range of >70%, in another embodiment >80%, in another embodiment >85%, in another embodiment >90%, and in yet another embodiment >95%.

VPSA Process/System Description

Figure 2:
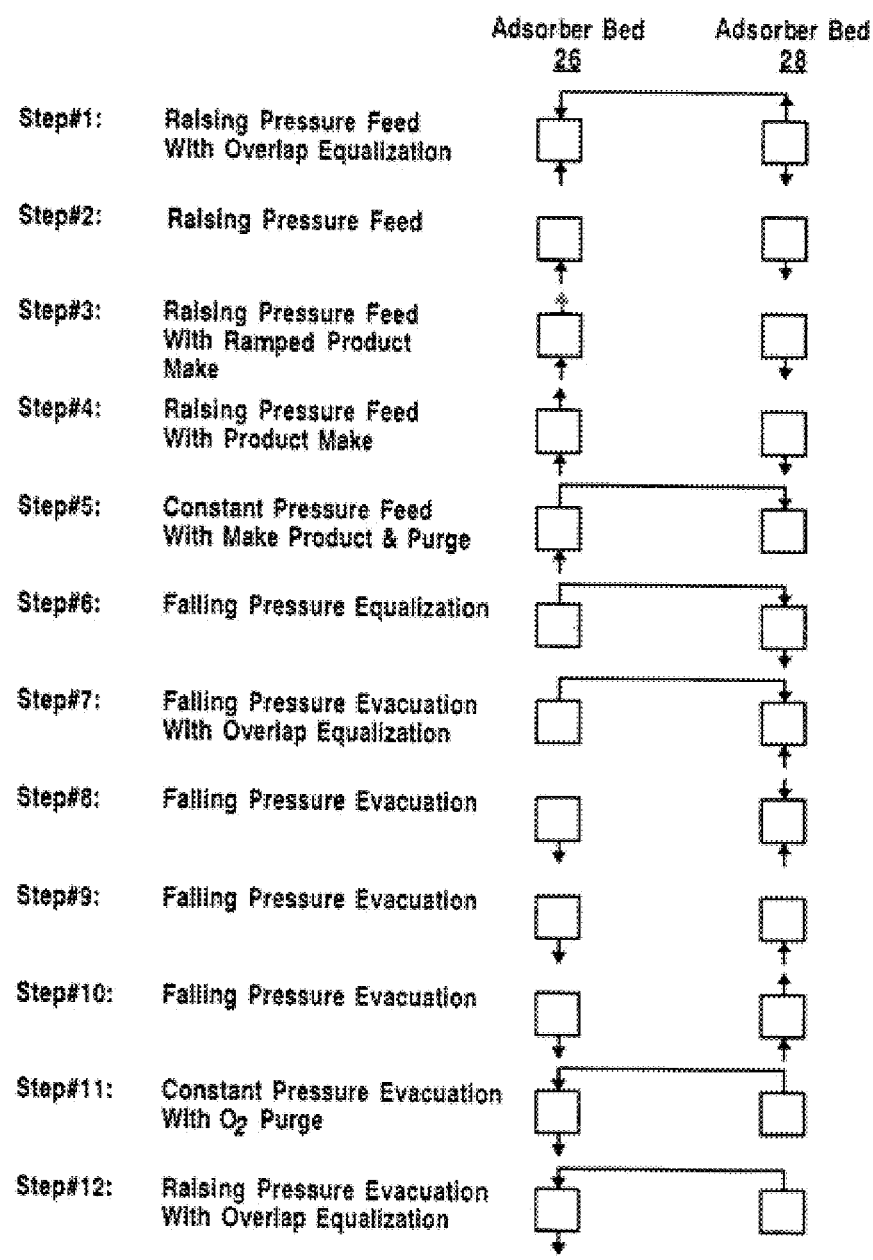
FIG. 2 is a process step diagram of the VPSA system of the invention.

Referring now to FIGS. 1 and 2, the operation of a VPSA system in accordance with the invention will be described. FIG. 1 shows a VPSA system 10 having a feed air inlet 12 that enables feed air to enter through inlet filter 14 and inlet silencer 16. Feed air blower 18 compresses the air for delivery to the system via discharge silencer 20 and conduit 22. During periods of unload, the feed blower is vented via valve 24.

Air enters adsorbers 26 and 28 via conduit 30 and open valves 32 and 34. Waste $N_2$ and contaminants are removed from the adsorbers via opened valves 38 and 40, conduits 36, conduit 42 and vacuum pump 44. Waste gas is silenced before venting by silencer 46. During periods of unload, vacuum pump 44 is recirculated through open valve 48.

Product reflux steps and product make is accomplished via conduit 50 and valves 52 and 54. Product make is conducted through conduit 56 and valve 58. Final product storage is contained within surge tank 60 and delivered to use point 62 via valve 64 and conduit 66. Each of adsorber beds 26 and 28 includes a high rate adsorbent that is selective for $N_2$, assuming that VPSA system is to be used for $O_2$ production.

The process steps performed by VPSA system of the invention are shown in Table 1, in conjunction with the process step diagram shown in FIG. 2.

TABLE 1

SINGLE STAGE CYCLE

| Step description | Step time seconds | Start Pressure psia | End Pressure psia |
|---|---|---|---|
| *Step #1 Raising pressure feed with overlap equalization | 3 | 8 | 14.5 |
| Step #2 Raising pressure feed | 1 | 14.5 | 17 |
| Step #3 Raising pressure feed with overlap product pressurization | 4 | 17 | 22 |
| Step #4 Constant pressure feed with Make-product | 3 | 22 | 23 |
| Step #5 Constant pressure feed with Make-product and purge | 6 | 23 | 23 |
| Step #6 Falling pressure equalization half cycle | 3 | 23 | 19 |
| Step #7 Falling pressure evacuation with overlap equalization | 3 | 19 | 13 |
| Steps #8 & #9 & #10 Falling pressure evacuation | 8 | 13 | 7 |
| Step #11 Constant pressure evacuation with Oxygen purge | 6 | 7 | 7 |
| Step #12 Raising pressure evacuation with overlap equalization | 3 | 7 | 8 |

Table 1 show the elapsed cycle time, start pressure and end pressure for each step of the representative cycle. One skilled in the art will recognize that the essential elements of the invention can be practiced using other cycle configurations. For the purpose of the cycle description below, the "bottom" of the vessel means the feed inlet while the "top" of the vessel is the product withdrawal point. Note that while the adsorber bed 26 undergoes steps 1-6, adsorber bed 28 undergoes steps 7-12.

Each of the steps listed in Table 1 is illustrated in FIG. 2.

Step #1—Raising Pressure Feed with Overlap Equalization:

This step initiates the feed air pressurization period. Air is fed to the bottom of adsorber bed 26 (for example) from compressor 18 and via conduit 22. The pressure rises rapidly within adsorber bed 26 from about 8.0 psia to about 14.5 psia. The step is 3 seconds in duration.

Step #2—Raising Pressure Feed without Product Pressurization:

This step continues the feed air pressurization period. Air is fed to the bottom of adsorber bed 26 from compressor 18. The pressure continues to rise during this step from 14.5 psia to about 17 psia, the step is approximately 1 to 5 seconds in duration.

Step #3—Raising Pressure Feed with Product Pressurization:

Feed air continues to be introduced into adsorber bed 26 and the top of the vessel i.e. valve 52 now opens partially and/or fully during this step. The pressure rises from 17.0 to about 22.0 psia during this 0 to 4 second step. Feed air is supplied by compressor 18 during this step.

Steps #4-#5—Constant Pressure Feed with Make-product:

Feed air is introduced into the bottom of adsorber bed 26 while oxygen product is removed from the top. The pressure remains relatively constant during this 6 to 9 second period at 22.0 to 23.0 psia. The feed air is supplied by compressor 18. The oxygen product is supplied to oxygen surge tank 60 as well as to adsorber bed 28 as oxygen purge during step 5. The purity of the oxygen product remains relatively constant (90%) during the product make steps.

Step #6—Falling Pressure Equalization:

The residual oxygen product at the top of adsorber bed 26 is withdrawn during this step from the top of the vessel. There is no flow from the bottom of adsorber bed 26. The vessel pressure falls from 23.0 to about 19.0 psia during this 3 second step. Compressor 18 is vented during this step.

Step #7—Falling Pressure Evacuation with Overlap Equalization:

Valve 38 is opened and waste nitrogen is removed from the bottom of adsorber bed 26 through vacuum pump 44. The pressure falls from 19.0 psia to about 13.0 psia during this 3 second step. The oxygen concentration starts at about air purity and falls rapidly. The equalization falling step continues as the oxygen-rich gas is removed from the top of adsorber bed 26.

Steps #8-#10—Falling Pressure Evacuation:

Waste nitrogen is removed from the bottom of adsorber bed 26 through the vacuum pump 44. The pressure falls from 13.0 psia to about 7.0 psia during this 8 second period. The top end of adsorber bed 26 is closed during this step. The oxygen concentration in the waste gas reaches its minimum at the end of step 10.

Step #11—Constant Pressure Evacuation with Oxygen Purge:

The minimum evacuation pressure is reached and oxygen purge is introduced to the top of adsorber 26. The pressure remains constant during this 3 to 6 second step at 7.0 psia due to the matching of the purge flow to the evacuation flow.

Step #12—Raising Pressure Evacuation with Overlap Equalization:

Vacuum pump 44 continues to remove waste gas from the bottom of adsorber bed 26 while oxygen equalization gas is added to the top thereof. The pressure rises during this step because the oxygen equalization flow is larger than the evacuation flow. The pressure rises from 7.0 to about 8.0 psia during the 3 second step.

The cycle described above is illustrative only, and the essential features of the invention can be practiced using other adsorptive cycles.

Figure 3:
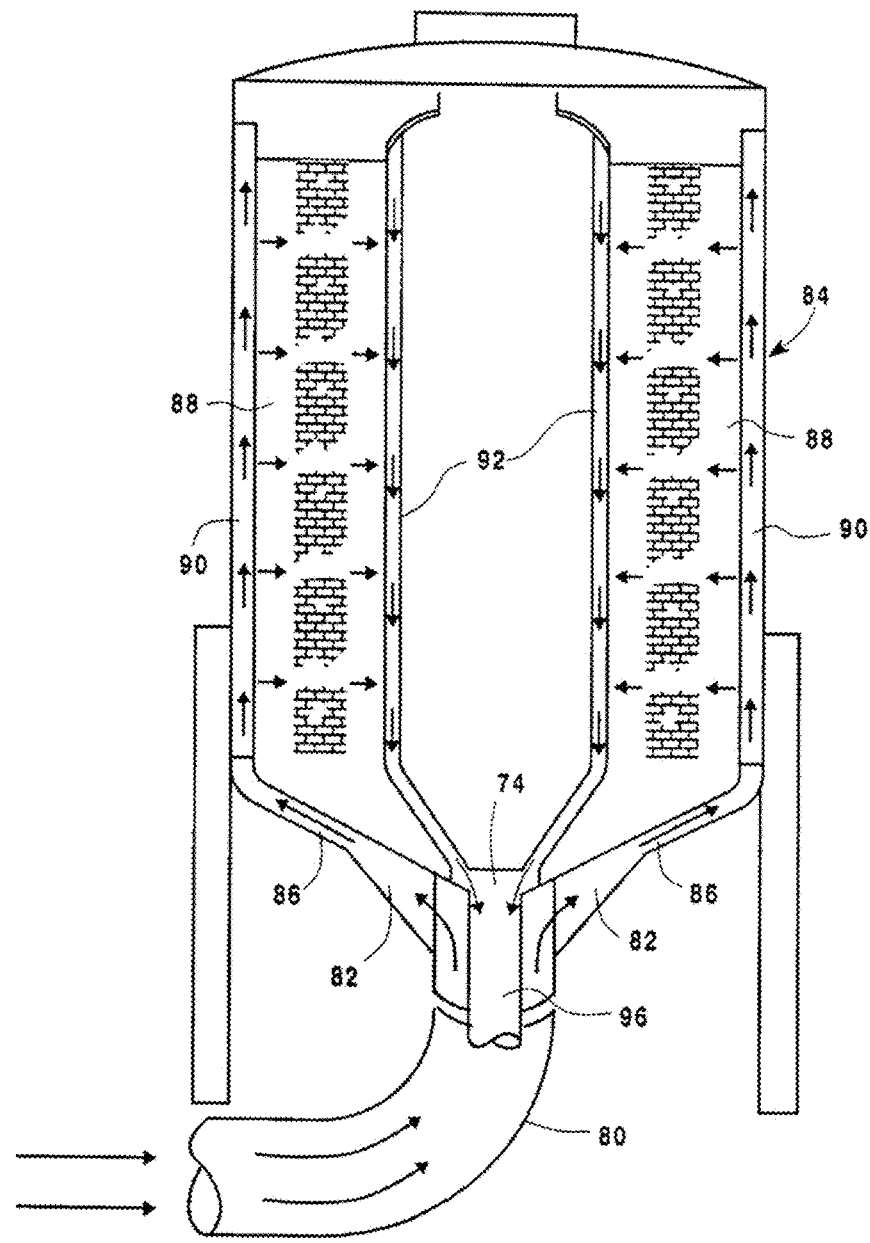
FIG. 3 is a schematic of a radial bed vessel according to the invention.

Radial Bed Configuration:

The VPSA method of the invention is suited to use with a radial bed structure in part because of the low pressure ratios that are employed. Such a radial bed configuration is shown in FIG. 3. Feed and waste gas is supplied through a conduit 80 to a radial flow distribution assembly 82 where the inlet gas flows to the outside walls of vessel 84.

The gas, which now is uniformly distributed in the lower head 86, is supplied to adsorption bed 88 via outside vertical flow paths 90, flowing upwardly through straight or tapered flow passages. The gas then flows through adsorber bed 88 in an inward radial manner. The gas exiting at the product end of adsorber bed 88 is collected inside vertical flow paths 92 and flows downward. The product gas is collected in a conical collection assembly 74 at the bottom of vessel 84. The collected product gas exits the vessel through conduit 96, contained within feed conduit 80. Alternatively, conduit 96 may be oriented such that the product gas is withdrawn at the top of the vessel in FIG. 3.

Vessel flow distribution is critical to successful operation of a VPSA process and a major contributor to flow distribution is the channel pressure differential between the feed and product ends of the adsorber. This pressure differential is a combination of frictional pressure losses and velocity-head changes in the flowing gases. These two effects tend to cancel when flow is entering a channel, and are additive when flow is exiting a channel. The degree of cancellation and addition is affected by the internal geometry of the chamber, i.e. through design of tapered channels. All VPSA processes by nature reverse the gas flow direction periodically to accomplish the subsequent adsorption and desorption process steps.

It should also be clear that the present invention may be practiced with various deployments of adsorbents in the main adsorbent zone, e.g. layers and mixtures of adsorbents of various types or of the same type but with varying adsorption and/or physical characteristics. For example, the low pressure ratio/high diffusivity concepts of this invention can be applied to the layered beds suggested by Ackley in U.S. Pat. No. 6,152,991. While the invention has been described for adsorbent zones consisting of a fixed bed of adsorbent particles, the invention may be practiced using alternative adsorbent deployment configurations, e.g., monoliths, adsorbent agglomerates dispersed on a fibrous substrate, etc.

Additional improvements may be achieved by appropriate selection of adsorbent particle size in conjunction with the adsorbent intrinsic diffusivity and combining in a low pressure ratio cycle. For air separation and for the preferred pressure ratio ranges and $N_2$ intrinsic diffusivities noted above, the preferred average particle size (diameter) is between 0.8 mm and 1.6 mm. This latter issue can be addressed best using radial flow, where the flexibility in selecting flow area, bed depth and flow distribution is greatest in regard to controlling pressure drop at acceptable levels. Radial flow adsorbers provide inherent constraint of the adsorbent such that fluidization can be avoided when using small particles.

This invention applies generally to a full range of cycle steps and process conditions, e.g. temperatures, pressures, feed velocity, etc. Likewise, its concepts can be applied to single-bed as well as multi-bed processes operating with subatmospheric (VSA), transatmospheric (VPSA) or superatmospheric (PSA) cycles. The concepts described here are not limited to any particular adsorber configuration and can be effectively applied to axial flow, radial flow, lateral flow, etc. adsorbers. The adsorbent may be constrained or unconstrained within the adsorber vessel.

EXAMPLE 1

The results were obtained via modeling and on a low rate plant with a MTC of ~14/s for $N_2$ and a high rate plant with a MTC of ~26/s for $N_2$. Table 2 shows the modeled and demonstrated effect of not opening the product valve until 0.25 s before the inflection point of the top of the bed and the surge tank. This prevented the plant from being able to generate the target purity for the low rate material and led to essentially economically equivalent results for the high rate material (more material was required but the power consumption decreased).

TABLE 2

|  | With PP | Without PP | High Rate With PP | High Rate Without PP |
|---|---|---|---|---|
| Purity | 90.5% | 88.6% | 89.8% | 89.9% |
| Power (kW) | 100.0% | 97.7% | 100.0% | 97.2% |
| Purity Correction Factor | 101% | 98% | 100.0% | 100% |
| Purity Corrected Production | 100.0% | 100.0% | 100.0% | 98.1% |
| Plant Actual Purity | 91.0% | * | 91.0% | 90.5% |
| Plant Actual Production | 100.0% | * | 100.0% | 100.0% |
| Plant Actual Power | 100.0% | * | 100.0% | 97.1% |

* Plant was unable to maintain contract purity of 91%

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

EXAMPLE 2

The results were obtained via modeling and on a high rate plant with a MTC of ~28/s for $N_2$. Table 3 shows the modeled and demonstrated effect of not opening the product valve fully until 2s after the inflection point of the top of the bed and the surge tank. This enabled the high rate plant to produce more $O_2$ product at equivalent purity but had no effect on the low rate plant.

TABLE 3

|  | High Rate Without Ramp | High Rate With Ramp |
|---|---|---|
| Purity | 90.4% | 90.5% |
| Power (kW) | 100.0% | 99.6% |
| Purity Correction Factor | 101% | 101% |
| Purity Corrected Production | 100.0% | 101.1% |
| Plant Actual Purity | 90.1% | 91.0% |
| Plant Actual Production | 100.0% | 100.0% |
| Plant Actual Power | 100.0% | 100.4% |

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

EXAMPLE 3

For a low rate plant the starting maximum top pressure is 11.3 psig for an economically relevant case. This case respects the 12 psig is ASME limit and provides a 0.5 psig offset for the process relief valve. This also considers a 0.2 psig normal variation of top pressure from cycle to cycle as part of the necessary assumptions for supply pressure. The typical pressure drop profile is show in Table 4.

TABLE 4

Figure 4:
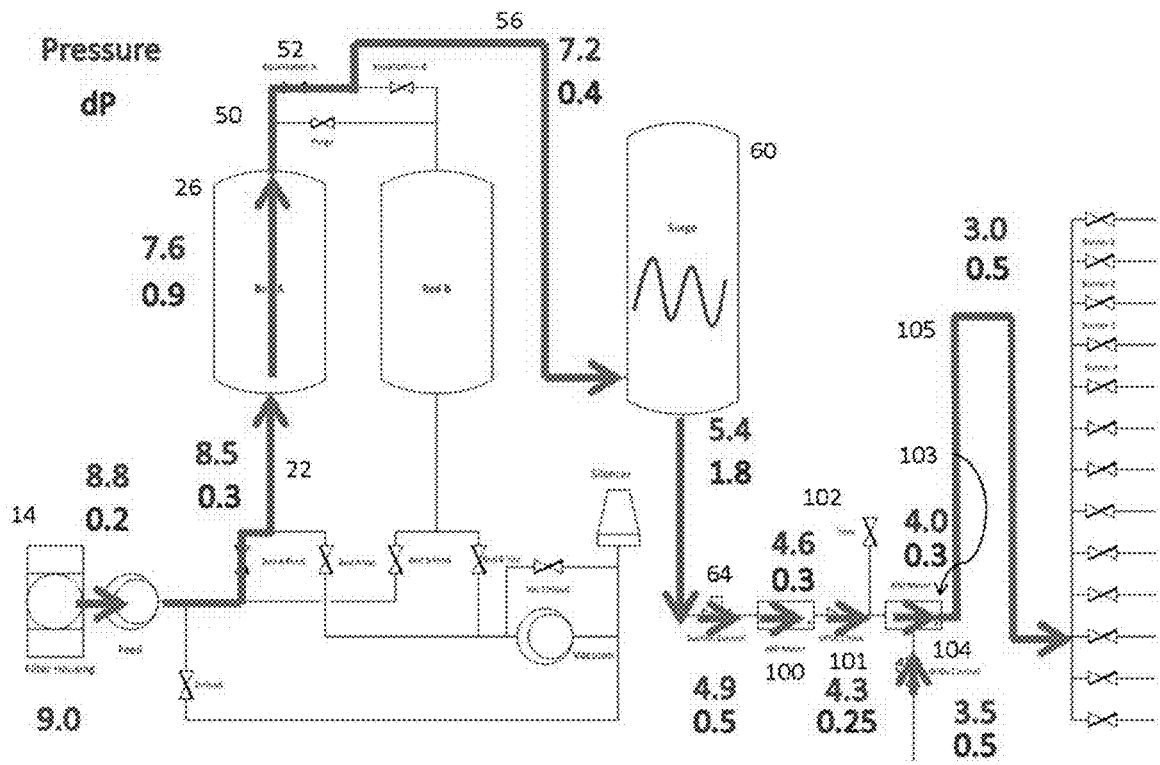
FIG. 4 is a process schematic detailing pressures and pressure drop of this invention.
Figure 5:
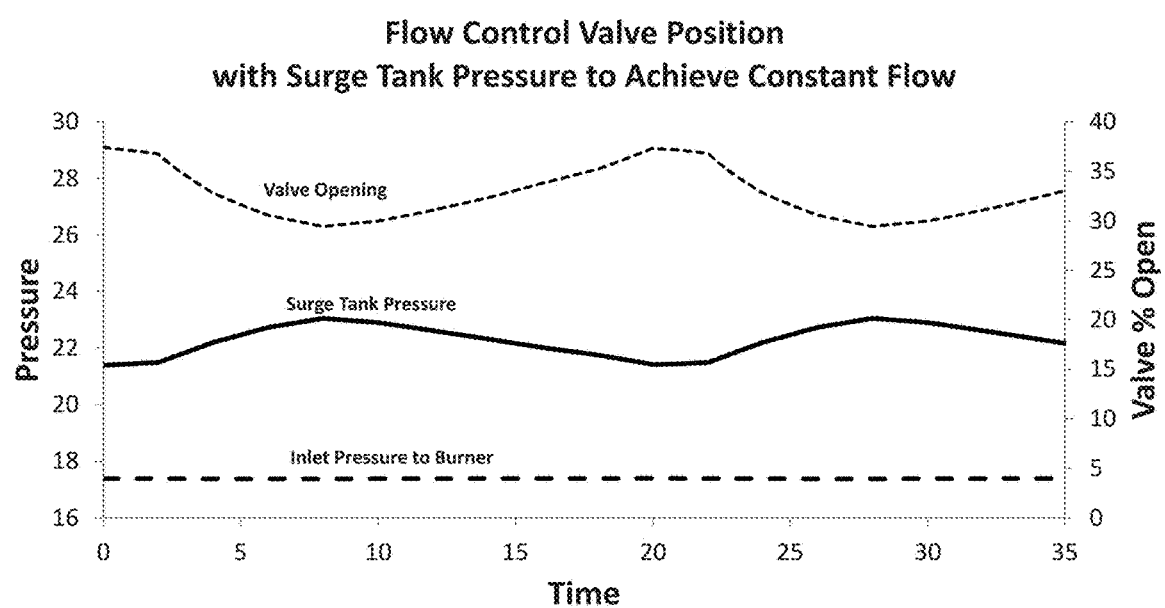
FIG. 5 shows the flow valve position with surge tank pressure to achieve constant flow.

| System component | FIG. 1 and 4 label | Pressure (psig) |
|---|---|---|
| Filter housing | 14 | 0.2 |
| After cooler | 18 | 0.25 |
| Piping to beds | 22 | 0.05 |
| Bed dP | 26 | 2 |
| Piping to surge tank | 50, 52, 56, 58 | 0.4 |
| Surge tank swing | 60 | 3.2 |
| Flow regulating valve | 64 | 1.5 |
| Flow meter | 100 | 1 |
| Check valve | 101 | 1 |
| Flow meter with backup | 103 | 1 |
| Backup offset | 104 | 0.5 |
| Piping to burner | 105 | 3 |
| Burner piping | 106 | 10 |
| Burner metering | 106 | 1 |
| dP in system |  | 25.1 |
| Maximum supply pressure |  | 11.3 |
| BLOB requirement |  | 13.8 |

For a high rate plant with the same starting pressure the modifications of the invention, a 25% unit power reduction and ~$400k in capital savings on a ~$3MM plant is achievable as shown in Table 5.

TABLE 5

| System component | FIG. 1 and 4 label | Pressure (psig) |
|---|---|---|
| Filter housing | 14 | 0.2 |
| After cooler | 18 | 0.25 |
| Piping to beds | 22 | 0.05 |
| Bed dP | 26 | 0.9 |
| Piping to surge tank | 50, 52, 56, 58 | 0.4 |
| Surge tank swing | 60 | 1.8 |
| Flow regulating valve | 64 | 0.5 |
| Flow meter | 100 | 0.3 |
| Check valve | 101 | 0.25 |
| Flow meter with backup | 103 | 0.3 |
| Backup offset | 104 | 0.04 |
| Piping to burner | 105 | 0.5 |
| Burner piping | 106 | 2 |
| Burner metering | 106 | 0 |
| dP in system |  | 7.49 |
| Maximum supply pressure |  | 11.3 |
| BLOB requirement |  | −3.81 |

This example has the following modifications which can optionally be added to further improve upon the invention:
1. Larger piping diameter to reduce pressure drop. The pipe can be made from carbon steel, copper, 304 stainless steel, or austenitic stainless steel. The pipe can also be made of UV resistant plastic.

2. Low pressure drop metering which could come from the use of mass flow meters.
3. An oversized surge tank 60 which is nominally 100 times larger than the volumetric flow per second. For example an 180,000 scfh flow would have a 5200 scf surge tank 60.
4. A low pressure drop check valve that is designed to limit the pressure drop to less than 0.5 psig.
5. A fast response pressure transducer that enables a P/PI/PID/PD controller with a cyclic correction factor which limits product pressure 62 variation to less than 0.5 psig.

EXAMPLE 4

Figure 6:
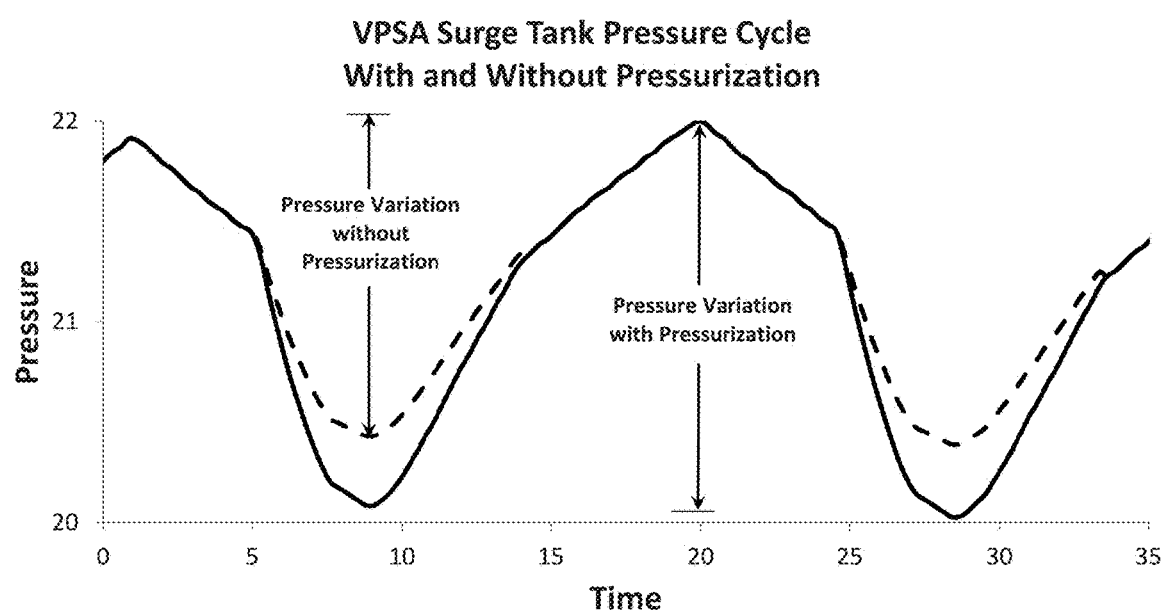
FIG. 6 is a graph of the VPSA surge tank pressurization cycle with and without pressurization.
Figure 7:
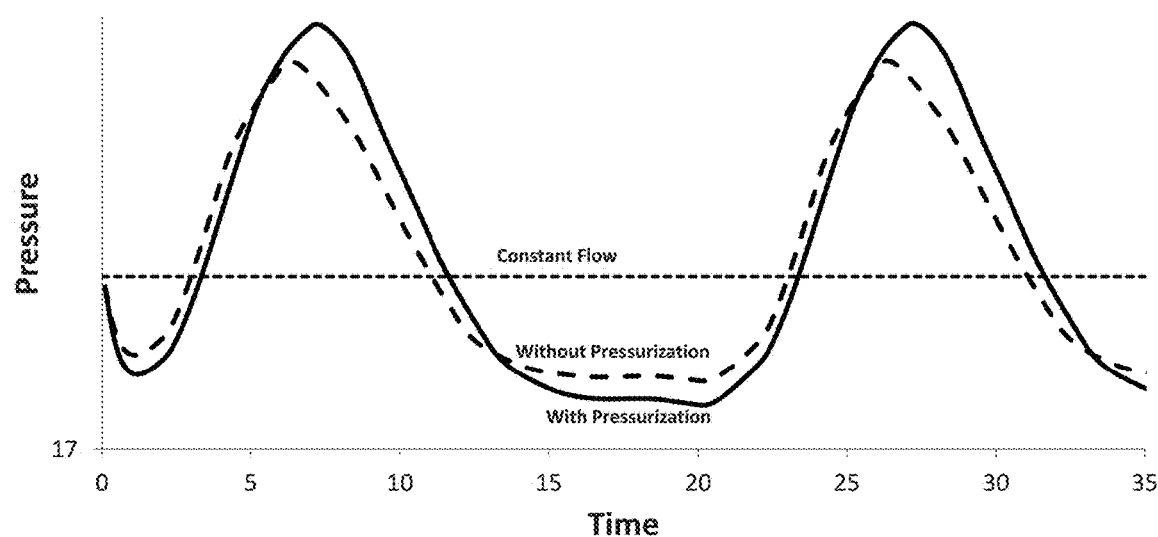
FIG. 7 illustrates burner pressure control with and without pressurization.

For combustion applications the product flow and pressure supplied must be controlled to a tight tolerance to ensure accurate temperature control and to satisfy gas emissions regulations. Ideally this can be achieved by regulating the flow from the surge tank using a flow control valve located just downstream of the surge tank. To provide a constant product flow the flow control valve needs to be positioned in step with the cyclic pressure in the surge tank—see FIG. 6. However, due to limitations in the valve response and pressure instrumentation, the valve position will lag the actual position needed to achieve constant flow and supply pressure. Note this lag can be minimized with the proper selection and integration of valves and instrumentation, along with the correct tuning of the flow controller. In addition, minimizing the pressure swing of the surge tank will also improve flow control by reducing the extent the valve must open and close. Towards this the use of rate a high rate adsorbent is beneficial since eliminate the use of pressurization which results in a smaller surge tank pressure swing—see FIG. 7. Table 6 shows an example of the cycle timing and subsequent biasing for the valve controlling pressure and or flow from the surge tank.

TABLE 6

| Cycle Time (s) | Valve % Open |
| --- | --- |
| 0.000 | 70.87 |
| 0.125 | 70.80 |
| 0.250 | 70.73 |
| 0.375 | 70.67 |
| 0.500 | 70.61 |
| 0.625 | 70.55 |
| 0.750 | 70.49 |
| 0.875 | 70.43 |
| 1.000 | 70.37 |
| 1.125 | 70.31 |
| 1.250 | 70.25 |
| 1.375 | 70.19 |
| 1.500 | 70.13 |
| 1.625 | 70.07 |
| 1.750 | 69.58 |
| 1.875 | 69.16 |
| 2.000 | 68.76 |
| 2.125 | 68.38 |
| 2.250 | 68.00 |
| 2.375 | 67.64 |
| 2.500 | 67.28 |
| 2.625 | 66.94 |
| 2.750 | 66.60 |
| 2.875 | 66.27 |
| 3.000 | 65.95 |
| 3.125 | 65.63 |
| 3.250 | 65.32 |
| 3.375 | 65.11 |
| 3.500 | 64.88 |
| 3.625 | 64.66 |
| 3.750 | 64.45 |
| 3.875 | 64.23 |
| 4.000 | 64.02 |
| 4.125 | 63.81 |
| 4.250 | 63.61 |
| 4.375 | 63.41 |
| 4.500 | 63.21 |
| 4.625 | 63.02 |
| 4.750 | 62.83 |
| 4.875 | 62.64 |
| 5.000 | 62.53 |
| 5.125 | 62.43 |
| 5.250 | 62.32 |
| 5.375 | 62.21 |
| 5.500 | 62.10 |
| 5.625 | 61.99 |
| 5.750 | 61.89 |
| 5.875 | 61.78 |
| 6.000 | 61.68 |
| 6.125 | 61.57 |
| 6.250 | 61.47 |
| 6.375 | 61.37 |
| 6.500 | 61.27 |
| 6.625 | 61.34 |
| 6.750 | 61.39 |
| 6.875 | 61.44 |
| 7.000 | 61.49 |
| 7.125 | 61.54 |
| 7.25 | 61.59 |
| 7.38 | 61.64 |
| 7.50 | 61.69 |
| 7.63 | 61.74 |
| 7.75 | 61.79 |
| 7.88 | 61.84 |
| 8.00 | 61.89 |
| 8.13 | 61.94 |
| 8.25 | 62.04 |
| 8.38 | 62.14 |
| 8.50 | 62.24 |
| 8.63 | 62.34 |
| 8.75 | 62.44 |
| 8.88 | 62.54 |
| 9.00 | 62.64 |
| 9.13 | 62.74 |
| 9.25 | 62.85 |
| 9.38 | 62.95 |
| 9.50 | 63.05 |
| 9.63 | 63.16 |
| 9.75 | 63.27 |
| 9.88 | 63.38 |
| 10.00 | 63.49 |
| 10.13 | 63.60 |
| 10.25 | 63.71 |
| 10.38 | 63.82 |
| 10.50 | 63.94 |
| 10.63 | 64.05 |
| 10.75 | 64.17 |
| 10.875 | 64.29 |
| 11.000 | 64.41 |
| 11.125 | 64.53 |
| 11.250 | 64.65 |
| 11.375 | 64.77 |
| 11.500 | 64.90 |
| 11.625 | 65.03 |
| 11.750 | 65.16 |
| 11.875 | 65.29 |
| 12.000 | 65.43 |
| 12.125 | 65.56 |
| 12.250 | 65.70 |
| 12.375 | 65.84 |
| 12.500 | 65.98 |
| 12.625 | 66.12 |
| 12.750 | 66.26 |
| 12.875 | 66.41 |
| 13.000 | 66.55 |
| 13.125 | 66.67 |

TABLE 6-continued

| Cycle Time (s) | Valve % Open |
|---|---|
| 13.250 | 66.79 |
| 13.375 | 66.92 |
| 13.500 | 67.05 |
| 13.625 | 67.17 |
| 13.750 | 67.30 |
| 13.875 | 67.43 |
| 14.000 | 67.56 |
| 14.125 | 67.70 |
| 14.250 | 67.83 |
| 14.375 | 67.97 |
| 14.500 | 68.10 |
| 14.625 | 68.24 |
| 14.750 | 68.43 |
| 14.875 | 68.61 |
| 15.000 | 68.80 |
| 15.125 | 68.98 |
| 15.250 | 69.17 |
| 15.375 | 69.36 |
| 15.500 | 69.56 |
| 15.625 | 69.75 |
| 15.750 | 69.95 |
| 15.875 | 70.16 |
| 16.000 | 70.36 |

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A pressure swing adsorption method for the separation of components of a feed gas mixture into at least a first component and a second component by selective adsorption of said first component into a bed of adsorbent, said method comprising the following steps on a cyclic basis:
    a) raising the pressure of said feed gas to said bed during adsorption steps of the cycle to an adsorption pressure so as to enable adsorption of said first component by said adsorbent, said adsorbent exhibiting a mass transfer coefficient of >=12/s and an intrinsic $N_2$ diffusivity of equal to or greater than $4.0 \times 10^{-6}$ $m^2$/sec at 27.55 psia and 300k,
    b) depressurizing said bed during the desorption steps of said cycle to a desorption pressure so as to desorb said first component from said adsorbent, a ratio of pressures of said adsorption pressure to said desorption pressure ranging from about 1.5 to 3.5;
    wherein said bed is pressurized to said adsorption pressure by pressurized feed gas and with no product pressurization.

2. The pressure swing adsorption method of claim 1, wherein a lowest pressure during a cycle is from 6 to 12 psia and a highest pressure during said cycle is from within about 2 to 12 psig.

3. The pressure swing adsorption method of claim 1, wherein said feed gas is air, said first component is nitrogen and said second component is oxygen.

4. The pressure swing adsorption method of claim 1, wherein said adsorbent is a particulate having an average particle diameter of from about 0.8 mm to about 1.6 mm.

5. The pressure swing adsorption method of claim 1, wherein said adsorbent is a type X zeolite with a $SiO_2/Al_2O_3$ ratio less than or equal to 2.5 and exchanged with Li (>70%).

6. The pressure swing adsorption method of claim 1, wherein said bed of adsorbent has a dimension, in a direction of flow of said gas through said bed of adsorbent, of less than about 1.2 m and said method performs steps a) and b) in a time of less than about 40 seconds.

7. The pressure swing adsorption method of claim 1, wherein said bed of adsorbent has a dimension, in a direction of flow of said gas through said bed of adsorbent, of less than about 0.9 m and said method performs steps a) and b) in a time of less than about 30 seconds.

8. The pressure swing adsorption method of claim 1, wherein said bed of adsorbent has a dimension, in a direction of flow of said gas through said bed of adsorbent, of less than about 0.6 m and said method performs steps a) and b) in a time of less than about 20 seconds.

9. The pressure swing adsorption method of claim 1, wherein said first component comprises N2 and said method is adapted for the recovery of $O_2$ from feed air in a purity range of >70% $O_2$.

10. A pressure swing adsorption system for separating components of a feed gas mixture into at least a first component and a second component by selective adsorption of said first component into a bed of adsorbent particles during the adsorption steps of the cycle, said system comprising at least two adsorption vessels each containing a bed of adsorbent material that is selective for said first component, said adsorbent exhibiting an intrinsic diffusivity for said first component that is equal to or greater than $4.0 \times 10^{-6}$ $m^2$/sec at 27.55 psia and 300k, said system configured to raise the pressure of said feed gas to the bed of adsorbent particles during adsorption steps of the cycle to an adsorption pressure so as to enable adsorption of said first component by said adsorbent and to depressurize said bed during the desorption steps of said cycle to a desorption pressure so as to desorb said first component from said adsorbent; wherein the ratio of adsorption to desorption pressures ranges from about 1.5 to 3.5,
    wherein each bed is configured to be pressurized by pressurized feed gas and with no product pressurization.

11. The system of claim 10, configured such that the pressure drop across each bed does not exceed about 1.0 psi during desorption and during adsorption.

12. The system of claim 10, configured such that the pressure drop across each bed does not exceed about 1.5 psi during desorption and during adsorption.

13. The system of claim 10, wherein each bed is arranged in a radial annular configuration, and said gas mixture exhibits a flow pattern that is transverse to said annular configuration.

14. The system as recited in claim 13, further comprising: a single stage vacuum pump coupled to each bed for withdrawing an adsorbed component from said bed during a desorption phase of said gas separation method.

15. The system of claim 10, wherein said gas is air, said first component is nitrogen and said second component is oxygen.

16. The system of claim 15, wherein the system exhibits a bed size factor <600 lb/TPDO and a specific power consumption <7.5 kW/TPDO.

17. The system of claim 10, wherein said bed of adsorbent has a dimension, in a direction of flow of said gas through each bed of adsorbent, of less than about 1.2 m and adsorption and desorption steps are performed in a time of less than about 40 seconds.

18. The pressure swing adsorption system of claim 10 which comprises one or more wherein said adsorbent beds are in series or parallel.

\* \* \* \* \*

UNITED STATES PATENT AND TRADEMARK OFFICE
CERTIFICATE OF CORRECTION

| | |
|---|---|
| PATENT NO. | : 10,792,610 B2 |
| APPLICATION NO. | : 15/945962 |
| DATED | : October 6, 2020 |
| INVENTOR(S) | : Nicholas R. Stuckert et al. |

It is certified that error appears in the above-identified patent and that said Letters Patent is hereby corrected as shown below:

In the Claims

Claim 18 Should read:
18. The pressure swing adsorption system of claim 10 which comprises one or more adsorbent beds wherein said adsorbent beds are in series or parallel.

Signed and Sealed this
Twenty-first Day of March, 2023

Katherine Kelly Vidal
*Director of the United States Patent and Trademark Office*